(No Model.)

J. E. BRIGGS.
BINOCULAR GLASS.

No. 395,872. Patented Jan. 8, 1889.

Witnesses
John Becker
Charles G. Johnson.

Inventor
James E. Briggs
by James Saw.
Attorney.

UNITED STATES PATENT OFFICE.

JAMES E. BRIGGS, OF BROOKLYN, NEW YORK.

BINOCULAR GLASS.

SPECIFICATION forming part of Letters Patent No. 395,872, dated January 8, 1889.

Application filed August 7, 1888. Serial No. 282,132. (No model.)

*To all whom it may concern:*

Be it known that I, JAMES E. BRIGGS, of the city of Brooklyn, in the county of Kings, State of New York, have invented a certain new and useful Improvement in Opera and other Binocular Glasses, of which the following is a full, clear, and exact description, reference being had to the accompanying drawings, making a part of this specification.

My improvement refers more particularly to that class of binocular glasses termed "opera" or "field" glasses, employed for observing objects at a distance, in which there are two or more adjustable tubes or barrels containing the lenses, but applies equally well to all binocular glasses mounted in tubes or barrels; and it consists, essentially, in arranging the tubes of the glasses in frames similar to spectacle-frames, so that the glass is supported on the nose and by the head of the spectator, and kept in position before the eyes of the latter without the necessity of being held by the hand of the person using the same.

Figure 1:
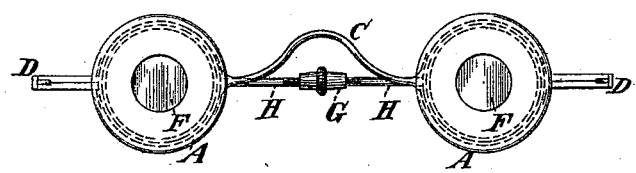
Figure 2:
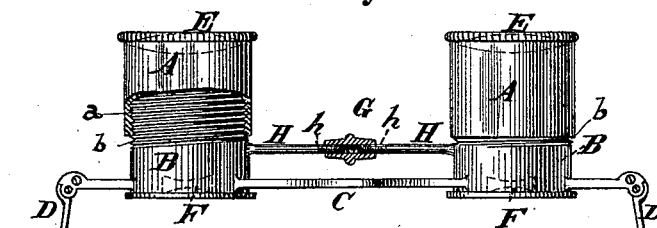
Figure 3:
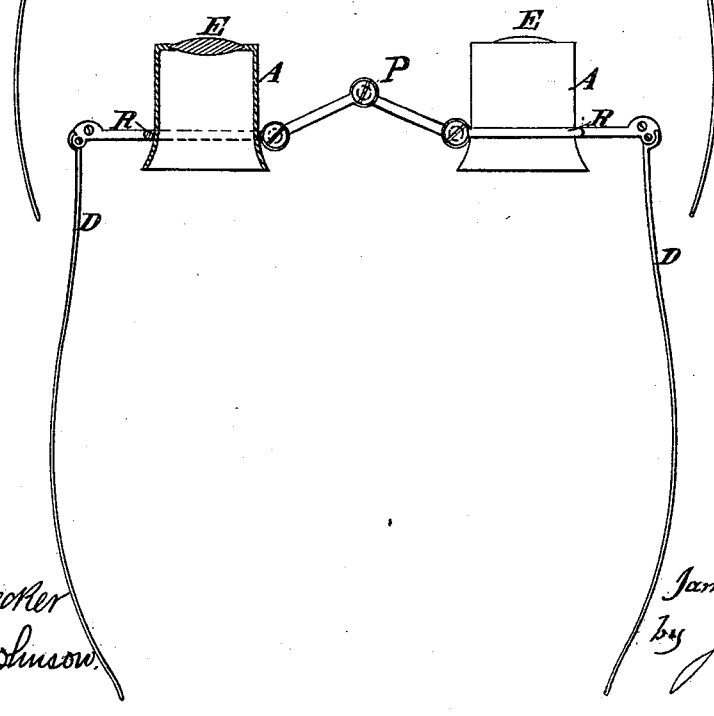

In the drawings illustrating my improvement, in which like letters indicate like parts, Figure 1 is a front view of an opera-glass mounted on a spectacle-frame according to my improvement. Fig. 2 is a side view of the opera-glass shown in Fig. 1, a part of the outer tube being broken away to show the arrangement of the tubes. Fig. 3 is a view of an ordinary binocular magnifying-glass, as a watch-maker's glass, mounted in tubes and attached to a frame according to my improvement.

The use of the ordinary opera or field glass, which is frequently quite heavy, is attended with much discomfort and fatigue to the spectator, as the glass must be held in position in front of the eyes by the hand, which soon results in tiring the arm, and where it is necessary to hold the glass in position a long time, which is often the case in determining objects at a distance with a heavy field or marine glass, the arm of the spectator becomes so tired that it is impossible to hold the glass as steady as is required to observe the object clearly.

My invention is intended to do away with this objection to the use of the opera and field glass, and to obviate the necessity of holding the glass by the hand, and supports the glass on or by the head of the spectator in the same manner as the ordinary spectacles or eyeglasses are supported, thus keeping the glass steadily in position before the eyes of the person as long as may be necessary or is desired without tiring the arms, and at the same time leaving the hands of the spectator free to be employed in any manner.

Figs. 1 and 2 of the drawings illustrate my improvement applied to an opera-glass in which there are two tubes or barrels containing the usual object and eye glasses; but the principle of construction would be the same with a field or other similar glass having a greater number of lenses and tubes containing the same.

To adapt the ordinary opera and field glass to my improvement, I employ very powerful lenses arranged at short focus, in order that the tubes in which the lenses are mounted may be as short and small as possible, and that a very slight movement of one tube on the other is all that is required to adjust the glass to different focuses. These tubes A and B, Fig. 2, in which the usual object and eye glass, E and F, are mounted, may be constructed of any suitable light material, and are preferably made in the form shown in the drawings, and of as small a diameter as the lenses used will permit. The tube A, containing the object-glass, may slide over the inner tube, B, to adjust the glass to different objects or different eyes in the usual manner; or, as I prefer to construct the glass, the tubes A and B may be provided with a fine screw-thread, *a* and *b*, as shown in Fig. 2, by means of which the outer tube, A, is screwed onto the inner one when it is desired to adjust the glass. In this latter form of construction it is possible to adjust the glass much more easily and quickly than where the tubes slide over one another. The tubes A and B thus constructed and containing the object and eye glasses E and F are mounted on or secured to the frame C D, Figs. 1 and 2, consisting of the nose-piece and side bars, in the same manner as the glasses of an ordinary pair of spectacles, the tube B being attached to the frame so as to bring the eyeglasses F in front of the eyes of the spectator. The nose-piece C and side bars, D, may be fastened directly to the tube B, as shown in Figs. 1 and 2, or may be attached to a ring, R, which encircles the tube, as shown in Fig. 3, and from which the tube, and consequently the glass, may be easily removed, if desired. The opera-glass thus mounted or supported on the frame C D is put on and worn by the spectator in the same manner as the ordinary spectacles, the nose-piece C resting on the bridge of the nose, and the side bar, D, extending back on each side of the head and back of the ears in the usual manner. The opera or field glass is thus supported in position in front of the eyes by the head of the spectator, and may be worn as long as is necessary or desired without fatigue and without the necessity of being held or touched by the hands.

To adjust the glasses to eyes of different distance apart, the device shown in Figs. 1 and 2, may be employed. As there seen, small bars H are secured to the inner or opposite sides of the tubes B in front of the nose-piece C, which is formed of flexible steel or wire, so as to readily yield in either direction, and so as not to interfere with the latter, and extend toward each other, as shown in Fig. 2. On the outer ends of these bars are right and left hand screws h, and over the ends of the bars and connecting the two together is the nut G. As will be understood from the drawings, as this nut is turned in one direction or the other, the tubes A and B are separated or drawn together, the spring nose-piece C readily yielding to accommodate this movement of the tubes, and thus the glasses may be readily adjusted at any distance from each other desired to accommodate the eyes of various persons.

Instead of the device shown in Figs. 1 and 2 to adjust the width of the glasses, the nose-piece C may be hinged or formed with a pivot, P, as shown in Fig. 3, by means of which the tubes may be spread apart or brought together, as is desired. The tubes having been adjusted to suit the eyes of the spectator and placed in position on the head of the latter, the glasses are adjusted or brought to the right focus by sliding or turning the outer tubes, A, over the inner tubes, B, by the hands until the correct focus is obtained for both eyes. I prefer to adjust the glasses for each eye separately, as it can be more conveniently accomplished by the hands when the glasses are in position on the head of the spectator, and, moreover, on account of the powerful lenses used, it would very seldom occur that the adjustment for one eye would be suitable for the other; but, if desired, the two tubes of the glass may be adjusted together by the usual device and in the same manner as in the ordinary opera or field glass.

In place of the eyeglasses F in the tubes B, pieces of ordinary non-magnifying glass may be used. The glass then becomes a magnifying-glass—such, as watch-makers or engravers use—and, having the two tubes A and B, may be adjusted to suit any eyes.

In Fig. 3 is shown the ordinary watch-maker's glass, having a single tube and glass mounted according to my improvement in a frame, so as to be supported on the head of the person using the same.

I do not wish to confine myself to the form or construction of the frame shown in the drawings, as the nose-piece C and side bars, D, may be of any form desired or found suitable, and the glass may be supported by the nose alone, as in the case of the ordinary eye-glasses.

What I claim as new is—

1. A binocular glass having the lenses contained in tubes secured and mounted to a frame, arranged and adapted to support the glass in front of the eyes by the head of the spectator, as and for the purposes set forth.

2. A binocular glass having the lenses contained in tubes secured and mounted to the frame C D, arranged and adapted to support the glass by the head of the spectator, as and for the purposes set forth.

3. A binocular glass having adjustable tubes containing the lenses secured and mounted on the frame C D, arranged and adapted to support the glass by the head of the spectator, as and for the purposes set forth.

4. A binocular glass having adjustable tubes containing the lenses and provided with the bars H and nut G, secured and mounted on the frame C D, arranged and adapted to support the glass by the head of the spectator, substantially as and for the purposes set forth.

Signed at New York, in the county of New York and State of New York, this 31st day of July, A. D. 1888.

JAMES E. BRIGGS.

Witnesses:
CHARLES E. JOHNSON,
JOSEPH C. LEVI.